United States Patent
Sato

(10) Patent No.: US 9,128,255 B2
(45) Date of Patent: Sep. 8, 2015

(54) INTERCONNECTING ADAPTER FOR LC TYPE OPTICAL CONNECTORS

(71) Applicant: SANWA DENKI KOGYO CO., LTD., Tokyo (JP)

(72) Inventor: Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/158,329

(22) Filed: Jan. 17, 2014

(65) Prior Publication Data
US 2014/0205239 A1 Jul. 24, 2014

(30) Foreign Application Priority Data
Jan. 21, 2013 (JP) .................................. 2013-008507

(51) Int. Cl.
G02B 6/38 (2006.01)
(52) U.S. Cl.
CPC ............ *G02B 6/3893* (2013.01); *G02B 6/3849* (2013.01)

(58) Field of Classification Search
CPC ............................ G02B 6/3849; G02B 6/3893
See application file for complete search history.

(56) References Cited

U.S. PATENT DOCUMENTS 5,363,460 A * 11/1994 Marazzi et al. ................. 385/70

FOREIGN PATENT DOCUMENTS

JP 2008-026778 A 2/2008

* cited by examiner

*Primary Examiner* — Omar R Rojas
(74) *Attorney, Agent, or Firm* — Bacon & Thomas, PLLC

(57) ABSTRACT

The invention prevents an LC type optical connector plug from seriously harming a body of a worker, particularly eyes of the worker in a work for fitting the LC type optical connector plug having various concavo-convex shapes. A connector housing (1) has in its inner side of a side wall a guide groove line (7a, 7b, 12) which inserts and guides LC type optical connector plugs (P1, P2) from its fitting portion, and a recess portion (11b) which conforms to a swing motion of a shutter plate (11), and the guide groove line (7a, 7b, 12) is constructed by cutting a part of the guide groove line (7a, 7b, 12) so as to form the same planar shape by forming the recess portion (11b).

3 Claims, 9 Drawing Sheets

INTERCONNECTING ADAPTER FOR LC TYPE OPTICAL CONNECTORS

BACKGROUND OF THE INVENTION

1. Field of the Invention

The present invention relates to an interconnecting adapter for LC type optical connectors, the adapter interconnecting a pair of opposed LC type optical connector plugs.

2. Description of the Conventional Art

Conventionally, as shown in Japanese Unexamined Patent Publication No. 2008-26778 resulting in Japanese Patent No. 4768539 which are prior applications by the applicant of the subject case, there has been proposed an interconnecting adapter for LC type optical connectors which can achieve an improvement of a workability and a cost reduction on manufacturing, and can prevent a retaining capacity of an LC type optical connector plug from being lowered, by provision of a housing constructed by an integral structure which is open in both ends and can accept the LC type optical connector plug from both directions, for the purpose of interconnecting a pair of opposed LC type optical connector plugs.

SUMMARY OF THE INVENTION

Problem to be Solved by the Invention

In the meantime, the conventional adapter for the LC type optical connector is structured such that optical axes of the LC type optical connector plugs are aligned with each other, the LC type optical connector plugs being fitted into fitting ends in both ends of a housing. At this time, in a state in which the LC type optical connector plugs is not fitted into one fitting end, when an optical part which is associated with the LC type optical connector plug connected to the other fitting end is under an operating state, a harmful laser beam, for example, having a power of about 5 mW is conducted to the one fitting end, and there is a risk that the laser beam seriously harms a body of a worker, particularly, eyes of the worker in a work for fitting the LC type optical connector plug into the one fitting end. Further, there has been a problem that a foreign material or a dust enters into an inner portion from the fitting end, whereby there is a risk of generation of defective connection.

Accordingly, the present invention is made by taking into consideration the conventionally existing circumstances as mentioned above, and an object of the present invention is to provide an interconnecting adapter for LC type optical connectors which can prevent the LC type optical connector plug from seriously harming a body of a worker, particularly, eyes of the worker in a work for fitting the LC type optical connector plug having various concavoconvex shapes, and can securely prevent a foreign material from entering into an inner side of a fitting end and can securely prevent a defective connection caused by the foreign material intrusion.

Means for Solving the Problem

In order to achieve the object mentioned above, according to the present invention, there is provided an interconnecting adapter for LC type optical connectors, the adapter comprising:

fitting portions of LC type optical connector plugs respectively provided in both ends of a connector housing so that optical axes are aligned;

a sleeve holder installing and retaining each of leading end portions of the LC type optical connector plugs inserted from the fitting portions in both ends, the sleeve holder being arranged in an inner portion of the connector housing;

a shutter plate which is diagonally arranged and closing at least one fitting portion of the connector housing;

a leaf spring which energizes the shutter plate in a closing direction;

the shutter plate and the leaf spring being arranged in the fitting portion; and the shutter plate being opened against a pressing force of the leaf spring by inserting the LC type optical connector plug from the fitting portion of the connector housing so as to fit into the sleeve holder, wherein the connector housing has in its inner side of a side wall a guide groove line which inserts and guides the LC type optical connector plug from its fitting portion, and a recess portion which conforms to a swing motion of the shutter plate, and wherein the guide groove line is constructed by cutting a part of the guide groove line so as to form the same planar shape by forming the recess portion.

The recess portion is formed as a fan shape so that a side surface of a movable portion of the shutter plate engages between a diagonal arrangement which closes the fitting portion and a horizontal arrangement which opens the fitting portion so as to freely swing.

The shutter plate is structured such that the side surface of the movable portion is formed so as to be wider than the fitting portion to which the LC type optical connector plug is inserted.

An inner side of a side wall of the connector housing is provided with an abutting surface which locks the side surface of the movable portion of the shutter plate at the swinging time in the closing direction, by the guide groove line and the recess portion.

Effect of the Invention

According to the present invention, it is possible to construct a security system for the LC type optical connector plug which can prevent the LC type optical connector plug from seriously harming a body of a worker, particularly eyes of the worker in a work for fitting the LC type optical connector plug having various concavo-convex shapes, and can securely prevent a foreign material from entering into the inner side of the fitting end and prevent a defective connection caused by the intrusion of the foreign material.

Particularly, since the connector housing has in its inner side of the side wall the guide groove line which inserts and guides the LC type optical connector plug from its fitting portion, and the recess portion which conforms to the swing motion of the shutter plate, and the guide groove line is constructed by cutting a part of the guide groove line so as to form the same planar shape by forming the recess portion, the shutter plate can be swung in the opening and closing direction without hindrance against the inserting operation of the LC type optical connector plug to the fitting portion.

Since the recess portion is formed as the fan shape so that the side surface of the movable portion of the shutter plate engages between the diagonal arrangement which closes the fitting portion and the horizontal arrangement which opens the fitting portion so as to freely swing, it is possible to avoid a contact of a ferrule core portion of the inserted LC type optical connector plug with the shutter plate surface. As a result, it is possible to prevent the end surface of the LC type optical connector plug from being soiled so as to lower its performance.

Since the shutter plate is formed so that the side surface of the movable portion is wider than the fitting portion to which the LC type optical connector plug is inserted, for conforming to the side surface of the recess portion, a sealability if the inner wall side of the side portion of the fitting portion is further improved by the shutter plate at the swinging time in the closing direction.

Since the inner side of the side wall of the connector housing is provided with the abutting surface which locks the side surface of the movable portion of the shutter plate at the swinging time in the closing direction, by the notch of the guide groove line and the recess portion, it is possible to securely lock the shutter plate in the diagonal arrangement.

BRIEF EXPLANATION OF THE DRAWINGS

FIGS. 2(A) to 2(E) show the interconnecting adapter for the LC type optical connectors with shutter, in which FIG. 2(A) is a front elevational view, FIG. 2(B) is a plan view, FIG. 2(C) is a side elevational view, FIG. 2(D) is a bottom elevational view, and FIG. 2(E) is a back elevational view;

DETAILED DESCRIPTION OF THE PREFERRED EMBODIMENT

A description will be in detail given below of an embodiment according to the present invention with reference to the accompanying drawings.

Figure 9:
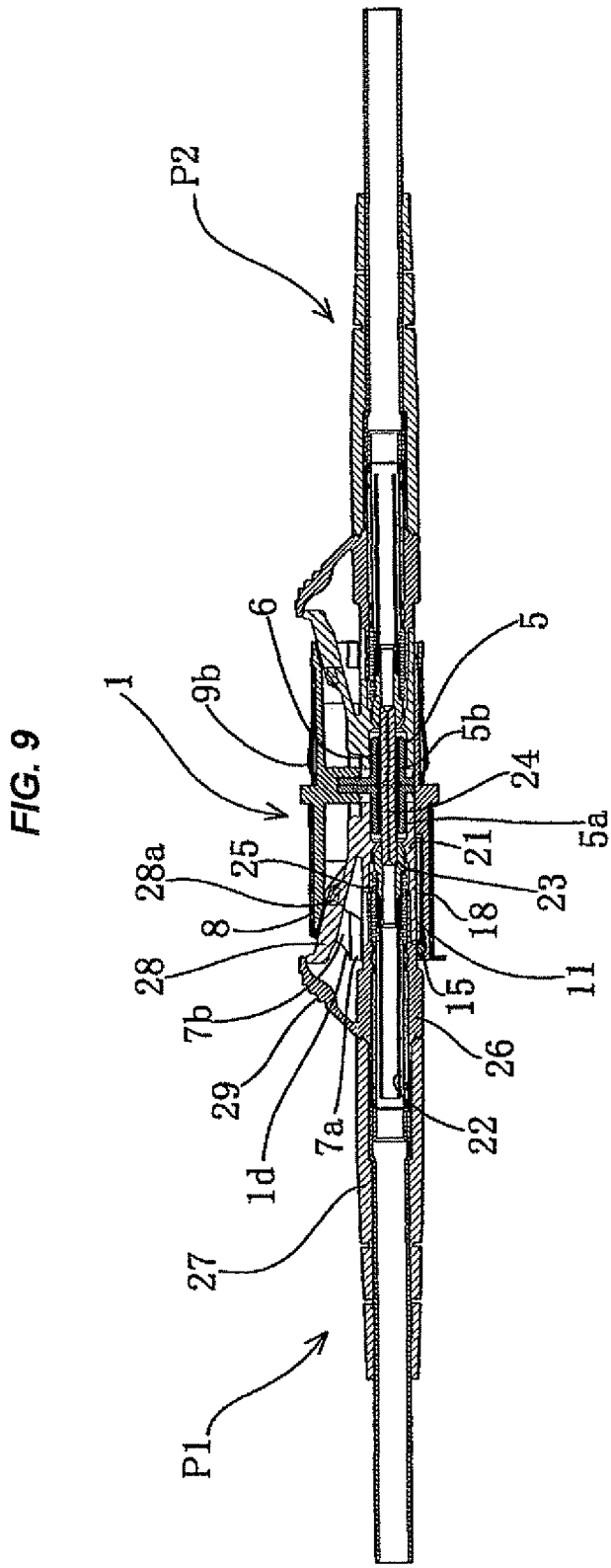
FIG. 9 is a vertical cross sectional view of a state in which the LC type optical connector plug is inserted from both directions of the interconnecting adapter for the LC type optical connectors.

In the present embodiment, as shown in FIGS. 1 to 5, there is provided a connector housing 1 which constructs an interconnecting adapter for two-core LC type optical connectors for interconnecting a pair of opposed LC type optical connector plugs P1 and P2 (refer to FIG. 9).

In the connector housing 1, an upper side wall 1a and right and left side walls 1b are integrally formed as an approximately U-shaped frame form in a front view, and a bottom wall 1c is attached between the right and left side walls 1b so as to be opposed to the upper side wall 1a, whereby the connector housing 1 is wholly formed as a rectangular tube body provided with fitting portions A and B in both ends. The fitting portions A and B can insert a pair of opposed LC type optical connector plugs P1 and P2 from both ends. Further, a rectangular tube shaped holder 8 for fixing the bottom wall 1c mentioned later to the right and left side walls 1b by attaching the bottom wall 1c to a bottom open side of the connector housing 1 is installed to the connector housing 1. Further, fixing brackets 9a and 9b are installed and fixed to the right and left side walls 1b of the connector housing 1 on the basis of an engagement between locking projections 10a and locking holes 10b. The fixing brackets 9a and 9b are formed by an approximately U-shaped metal frame piece and are provided with a plurality of locking springs for fixing panels. The locking projections 10a are provided in a side of the connector housing 1, and the locking holes 10b are provided in a side of the fixing brackets 9a and 9b.

Figure 3:
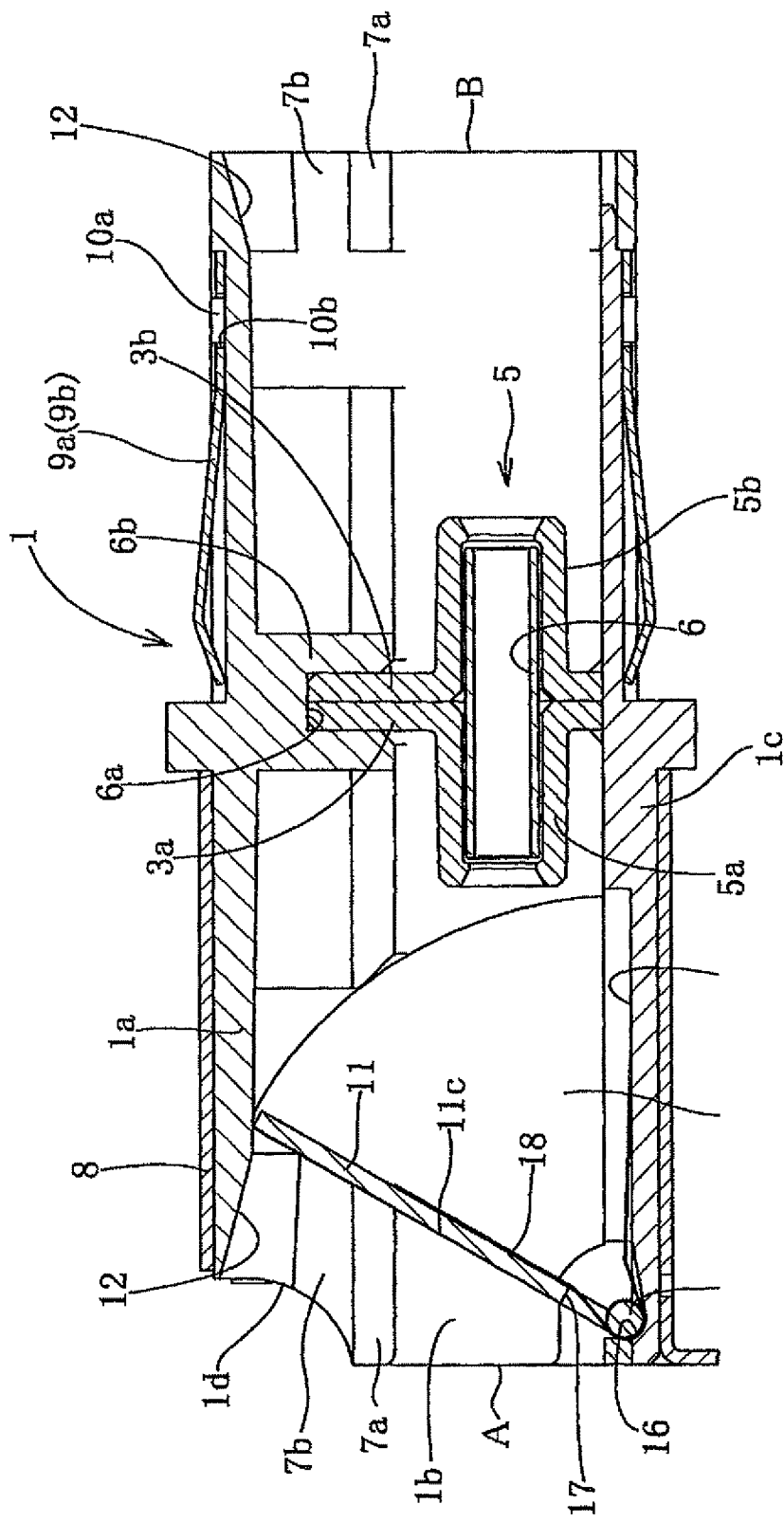
FIG. 3 is a cross sectional view along a line A-A in FIG. 2(B)
Figure 4:
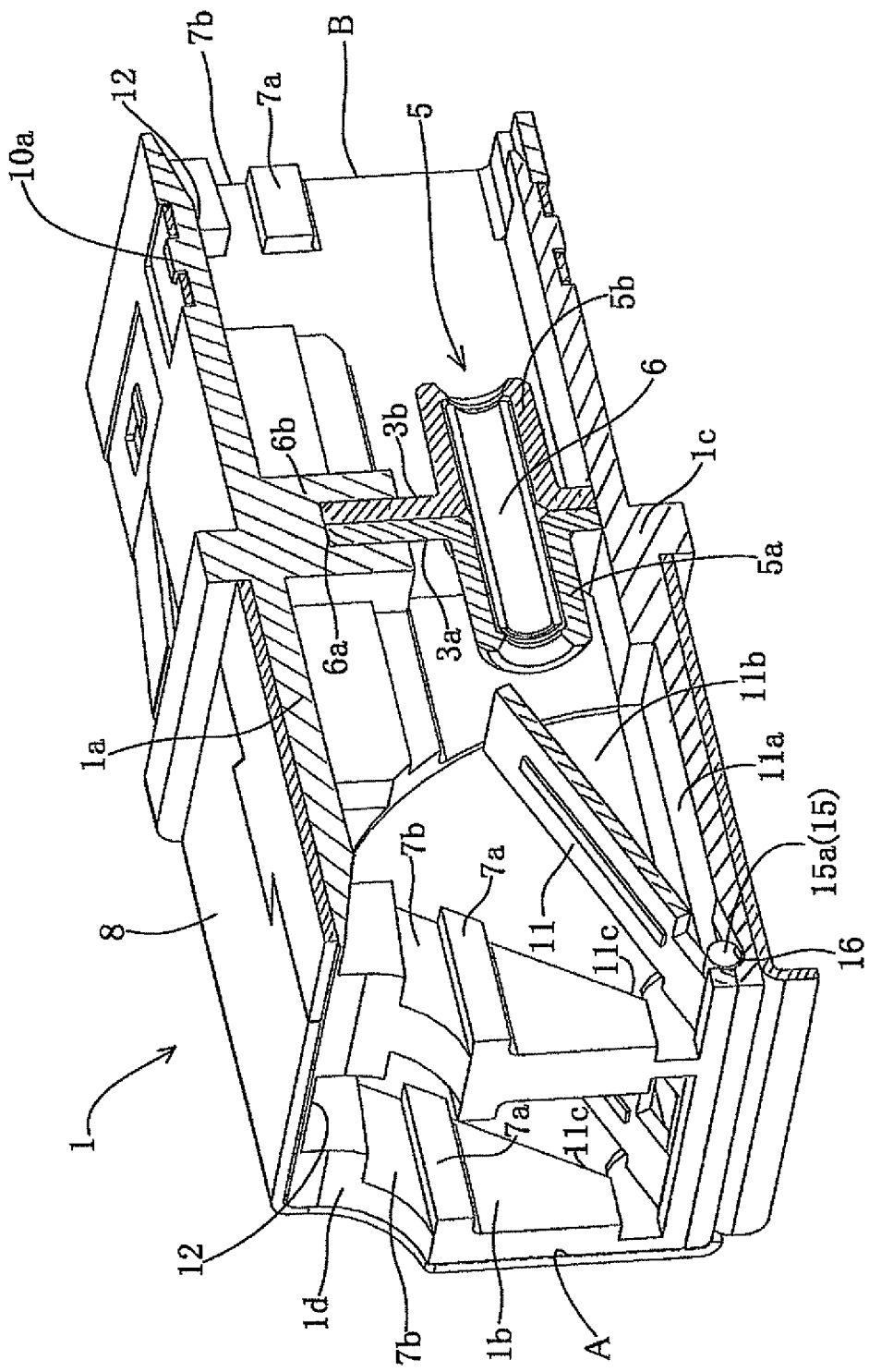
FIG. 4 is a perspective view of a state in which the cross section along the line A-A in FIG. 2(B) is seen from a front surface side.
Figure 5:
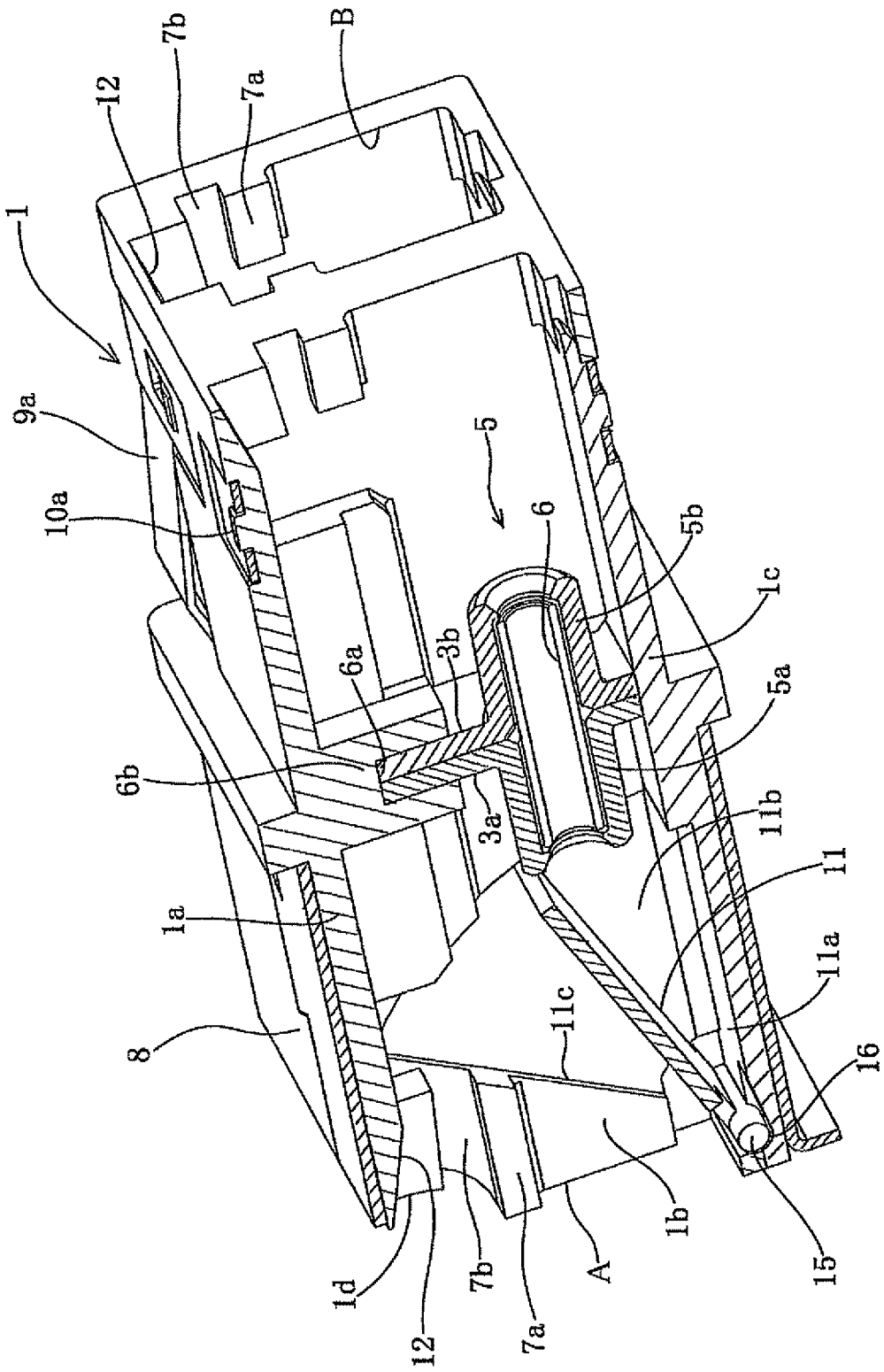
FIG. 5 is a perspective view of a state in which the cross section along the line A-A in FIG. 2(B) is seen from a back surface side.

A partition projection 6b is vertically provided in the center of the upper side wall 1a in an inner portion of the connector housing 1 as shown in FIGS. 3 to 5. A fitting concave portion 6a is formed in the center of a lower end of the partition projection 6b. Upper end portions of a pair of joint end wall members 3a and 3b constructing a sleeve holder 5 are attached to the fitting concave portion 6a in a state in which the upper end portions are aligned with each other. One cylinder 5a is provided in one joint end wall member 3a arranged in the center portion of the connector housing 1 so as to protrude toward the one fitting portion A, and the other cylinder 5b is provided in the other joint end wall member 3b so as to protrude toward the other fitting portion B. The sleeve holder 5 is formed by engaging and fixing fitting claws 4a and engagement portions 4b which are formed alternately in corner portions of the joint end wall members 3a and 3b so that center axes of both the cylinders 5a and 5b are aligned on an optical axis (refer to FIG. 1). At this time, both the cylinders 5a and 5b are arranged so as to protrude in opposite directions in a state in which rear end surfaces of the cylinders 5a and 5b come into contact with each other via the joint end wall members 3a and 3b. Accordingly, one split sleeve 6 is arranged in both the adjacent cylinders 5a and 5b in a state in which the split sleeve 6 is inward inserted.

Further, as shown in FIGS. 3 to 5, a concave groove portion 7b is formed in an upper side of right and left side walls 1b in an inner portion of the connector housing 1. The concave groove portion 7b is provided with a guide protrusion 7a in a lower side for inserting and guiding the LC type optical connector plugs P1 and P2 along a longitudinal direction. The guide protrusion 7a and the concave groove portion 7b correspond to a concavo-convex outer shape of the LC type optical connector plugs P1 and P2. Further, a key groove 12 is formed in the center of the upper side wall 1a in the one fitting portion A. The key groove 12 is formed as a linear groove line along a direction of an optical axis for guiding when the LC type optical connector plugs P1 and P2 are inserted. Each of the guide protrusion 7a and the concave groove portion 7b constructs a guide groove line described in each of claims.

As shown in FIGS. 1 to 9, an arc-shaped notch portion 1d is formed in an upper end of the one fitting portion A of the connector housing 1 which is employed in the embodiment mentioned above. Further, in place of the insertion of the LC type optical connector plug P2 into the other fitting portion B, the other optical part, for example, the SC type optical connector plug or the other plug may be inserted.

A shutter plate 11 for closing the fitting portion A in a diagonal arrangement is arranged in the one fitting portion A of the connector housing 1 so that the shutter plate can be opened and closed in an inner side. In other words, the shutter plate 11 is structured such that a support shaft 15 is integrally provided in a protruding manner at a horizontal position of its lower end, and protruding portions 15a provided in symmetrical positions in both ends of the support shaft 15 are rotatably supported to a shaft hole 16 which is formed over the bottom wall 1c at the right and left opposed positions of the lower portion of the fitting end of the fitting portion A, and the right and left side walls 1b.

Further, a rectangular opening portion 17 is formed approximately in the center of the lower end of the shutter plate 11 where the shutter plate 11 and the support shaft 15 are connected, a leaf spring 18 which is formed by being bent in an approximately L-shaped form and is made of a metal is outward fitted to the center of the support shaft 15 via the opening portion 17, one end of the leaf spring 18 is brought into pressure contact with a rectangular concave portion 11a (having a magnitude and a thickness which correspond to a whole surface of the shutter plate 11) formed in an inner surface of the bottom wall 1c, and the shutter plate 11 is energized in a closing direction by bringing the other end of the leaf spring 18 into pressure contact with the inner side of the shutter plate 11.

Accordingly, as shown in FIGS. 3 to 5, a fan-type recess portion 11b using the shaft hole 16 as a so-called pivot of fan is formed in each of the right and left side walls 1b so that the shutter plate 11 can be swung so as to be opened and closed. At this time, the recess portion 11b is formed by cutting a part of the guide protrusion 7a and the concave groove portion 7b (the guide groove line described in each of claims). Further, the shutter plate 11 is formed wider than a transverse width of the fitting portion A (inlet) to which the LC type optical connector plug P1 is inserted, and the shutter plate 11 itself can swing in an opening and closing direction, while a side surface of a movable portion of the shutter plate 11 engages into each of the right and left fan-shaped recess portions 11b.

Further, in an inner wall surface of each of the right and left side walls 1b of the fitting portion A of the connector housing 1, a stepped abutting surface 11c is formed over the guide protrusion 7a and the concave groove portion 7b (the guide groove line described in each of claims), in an upper end edge of the recess portion 11b (an end of closing movement of the shutter plate 11), and is structured such as to lock a side surface of a movable portion of the shutter plate 11 when the shutter plate 11 swings in the closing direction.

An upper end of the shutter plate 11 is structured such as to be locked approximately in a sealed manner to a key groove 12 which is provided in the upper side wall 1a of the connector housing 1. Further, an opening portion 17 provided between a lower end of the shutter plate 11 and the support shaft 15 is in a state in which the opening portion 17 is always closed by an elastic force of the leaf spring 18. Accordingly, any dust does not enter into the connector housing 1 from the opening portion 17. Further, the leaf spring 18 is provided with a length by which one end of the leaf spring 18 is arranged so as to be extended to an optical axis when the shutter plate 11 is brought into pressure contact with the abutting surface 11c in the one fitting portion A of the connector housing 1.

The shutter plate 11 is formed such that the shutter plate 11 is opened against a pressing force of the leaf spring 18 by fitting the LC type optical connector plug P1 to the one fitting portion A of the connector housing 1.

The LC type optical connector plug P1 (P2) is provided with a coupling sleeve 21 which is made of a plastic having a comparatively high strength, a tube 22 for ferrule and a ferrule frame 23 which are provided within the coupling sleeve 21, a ferrule 24 which is installed to the ferrule frame 23, a spring 25 which is installed to an outer periphery of a rear end portion of the ferrule frame 23, a main body frame 26 which is fitted to a rear end portion of the ferrule frame 23 via the spring 25 and is made of a plastic, and a boot 27 which is installed to a rear portion of the main body frame 26, as shown in FIG. 9.

Further, as shown in FIGS. 6 to 9, in an outer peripheral surface of the coupling sleeve 21, a release lever 28 is integrally provided in the coupling sleeve 21. The release lever 28 has a pair of right and left engagement projections 28a which are inserted to the concave groove portions 7b arranged in the upper sides within the fitting portions A and B provided in both ends of the connector housing 1 while engaging, and is provided for carrying out an engagement with the key groove 12 and a release from the key groove 12. The release lever 28 is extended in an inclined manner from a leading end portion of the coupling sleeve 21 toward a rear end portion thereof so as to be away from an outer surface of the coupling sleeve 21 little by little, and the rear end portion protrudes in an inclined manner to an opposite side to the coupling sleeve 21 so as to come into contact with a latch lever 29 which is formed in an outer peripheral surface of the main body frame 26.

The ferrule 24 of the LC type optical connector plug P1 installed from the one opening side (for example, the fitting portion A) of the connector housing 1 is fitted to the one side of the sleeve holder 5, and the ferrule 24 of the LC type optical connector plug P2 optically connected to the LC type optical connector plug P1 is fitted to the other side of the sleeve holder 5, whereby the LC type optical connector plugs are aligned in an axial direction while bringing the leading ends of both the ferrules 24 into contact with each other via the split sleeve 6 which is inward installed over both the cylinders 5a and 5b.

In place of the structure of the adapter for interconnecting the LC type optical connectors by the two-core connector housing 1 mentioned above, an adapter for interconnecting the LC type optical connectors by the four-core connector housing 1 may be structured.

Next, a description will be given of an example of assembly, use and motion with regard to the best mode structured as mentioned above.

Figure 1:
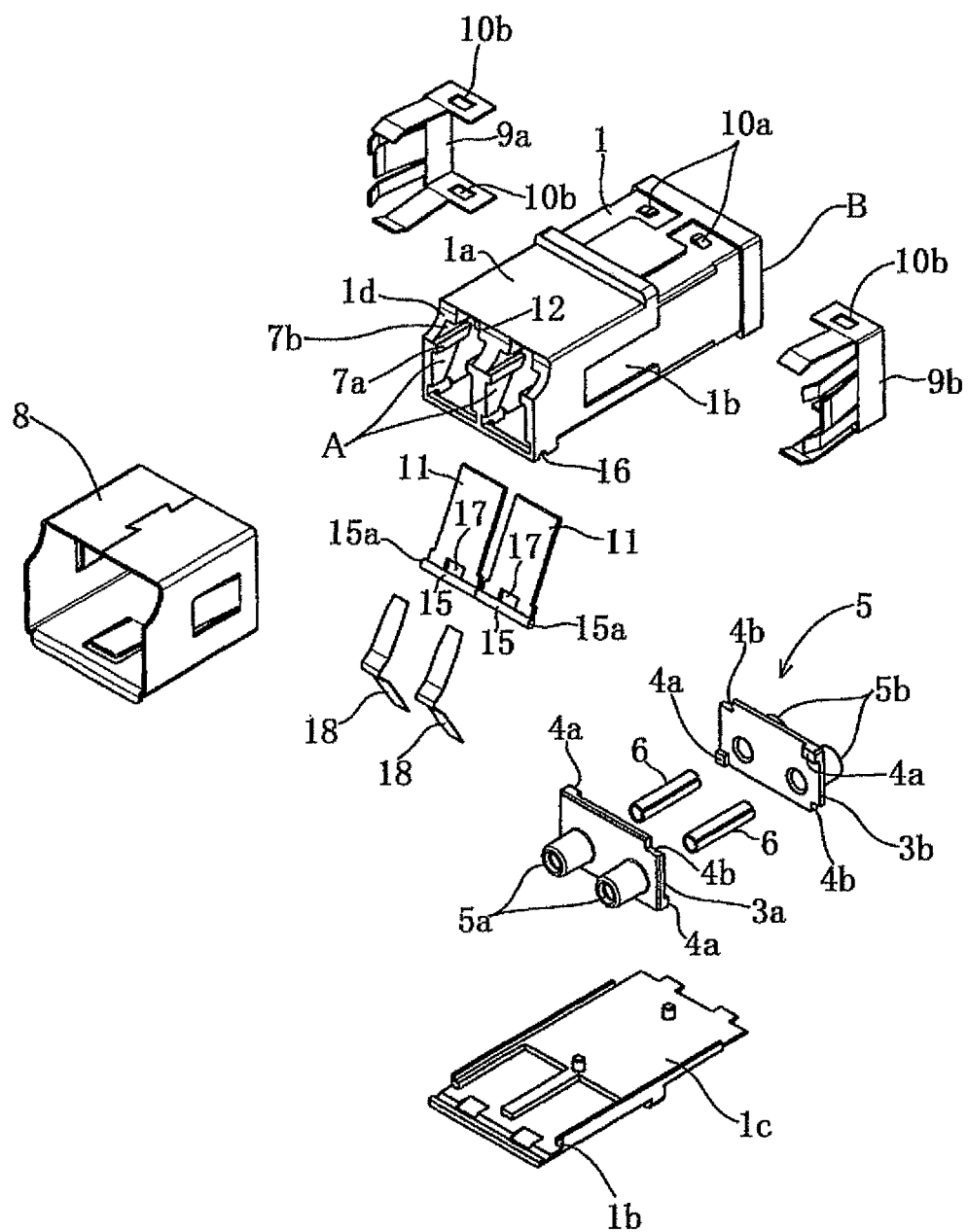
FIG. 1 is an exploded perspective view showing an interconnecting adapter for LC type optical connectors with shutter according to the best mode for carrying out the present invention.
Figure 2:
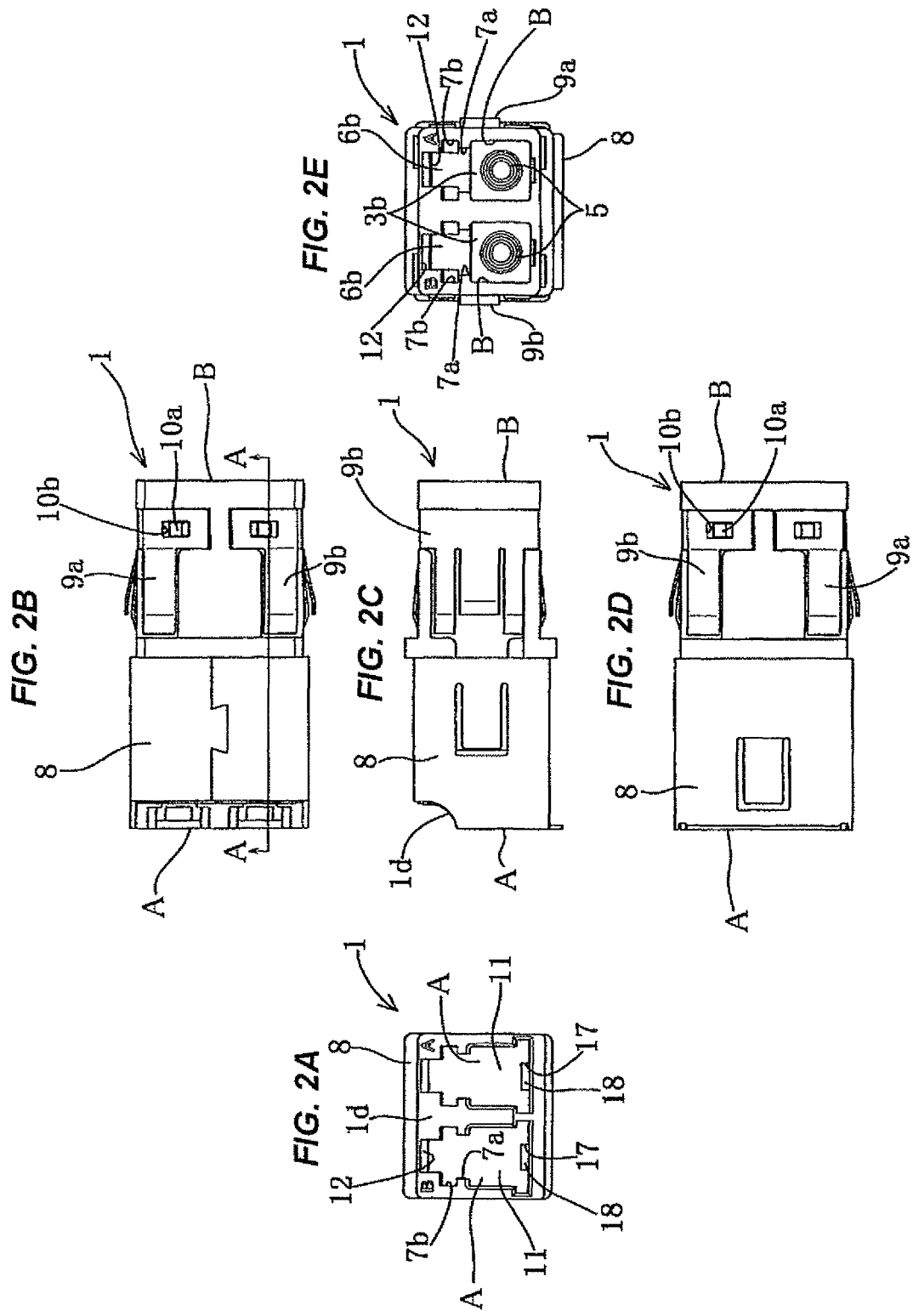

When assembling the adapter for the LC type optical connector, both the cylinders 5a and 5b are aligned their center axes on the optical axis and the joint end wall members 3a and 3b are engaged with and fixed to each other via the fitting claw 4a and the engagement portion 4b, in a state in which the split sleeve 6 is installed between both the cylinders 5a and 5b which form the sleeve holder 5, as shown in FIG. 1. Further, the sleeve holder 5 is embedded in the fitting concave portion 6a of the partition projection 6b in the center of the upper side wall 1a of the housing 1.

At the same time, the leaf spring 18 is outward fitted to the center of the support shaft 15 via the opening portion 17 of the shutter plate 11, the protruding portions 15a in both ends of the support shaft 15 of the shutter plate 11 are thereafter mounted to the shaft hole 16 of the bottom wall 1c, and a pair of side walls 1b arranged in the right and left sides of the upper side wall 1a which is formed approximately as the U-shaped form in the front view are respectively embedded on the bottom wall 1c.

At this time, as shown in FIG. 3, one end of the leaf spring 18 is brought into pressure contact with the concave portion 11a of the bottom wall 1c, and the other end is brought into pressure contact with the inner side surface of the shutter plate 11, thereby energizing the shutter plate 11 approximately in the inclined state in the direction of closing the fitting end in the one fitting portion A.

Further, the rectangular tube shaped holder 8 is installed to the connector housing 1, and the bottom wall 1c is fixed to the right and left side walls 1b. At the same time, the fixing brackets 9a and 9b for fixing the panel are respectively installed to the right and left side walls 1b of the connector housing 1.

Figure 6:
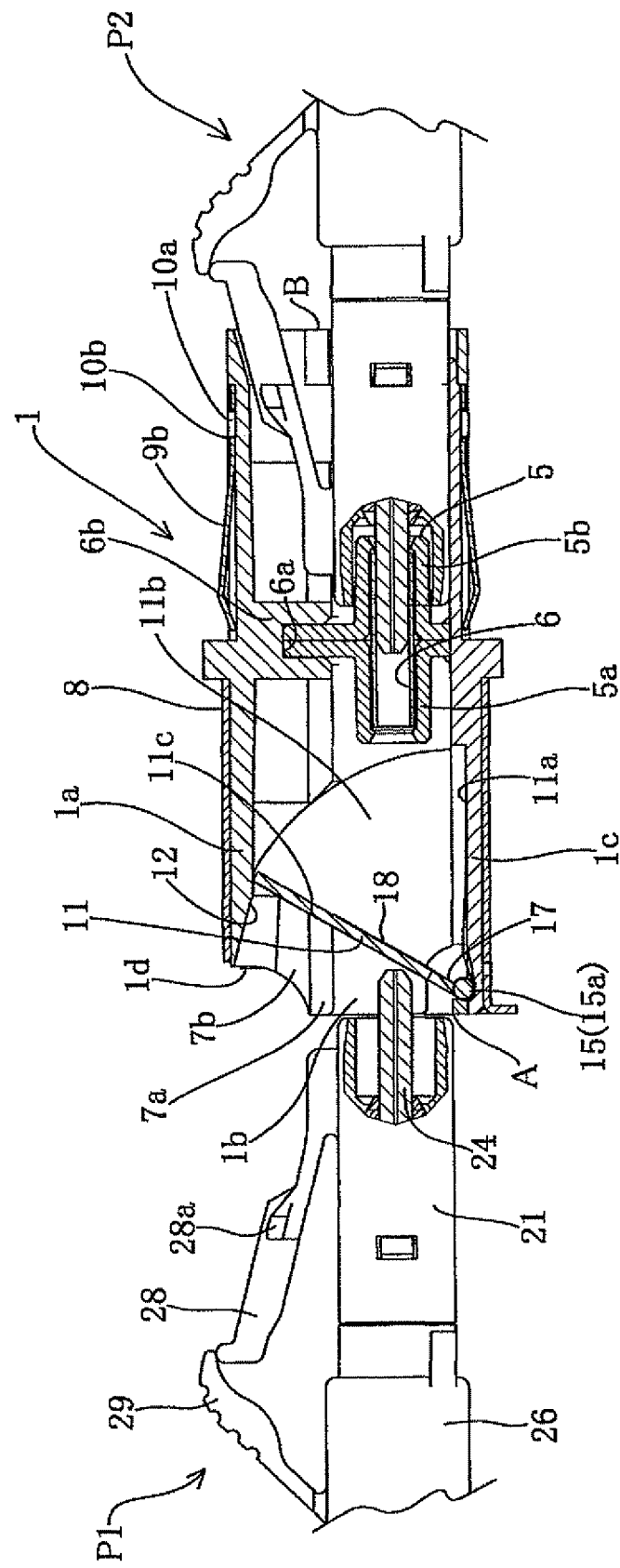
FIG. 6 describes an inserting process of an optical connector into the interconnecting adapter for the LC type optical connectors with shutter, and is a center vertical cross sectional view of a state before the insertion.

Next, when using the adapter for the LC type optical connector, the shutter plate 11 closes the fitting end in the one fitting portion A on the basis of the elastic force in the expanding direction of the approximately L-shaped leaf spring 18, before the LC type optical connector plug P1 is fitted to the one fitting portion A of the connector housing 1, first of all, as shown in FIG. 6. At this time, the side surface of the movable portion of the shutter plate 11 is locked by the abutting surface 11c.

Figure 7:
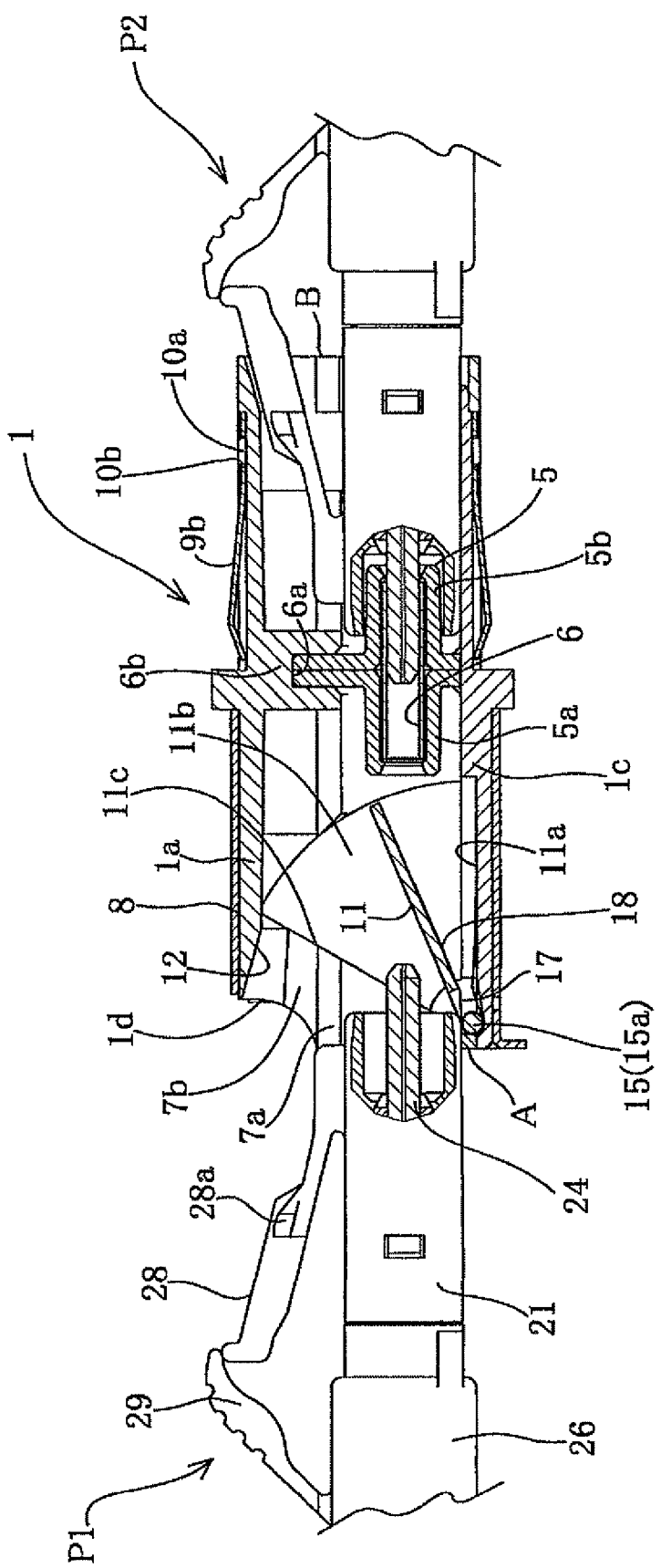
FIG. 7 describes the inserting process of the LC type optical connector plug into the interconnecting adapter for the LC type optical connectors with shutter, and is a center vertical cross sectional view of a state in which a shutter plate is pressed and tilted by the insertion.

As shown in FIG. 7, the shutter plate 11 under closing is pushed by the insertion of the LC type optical connector plug P1 into the fitting portion A of the connector housing 1, and the shutter plate 11 is tilted to the inner side of the fitting end against the elastic force of the leaf spring 18. At this time, the side surface of the movable portion of the shutter plate 11 swings the shutter plate 11 itself in the opening direction (to the lower side) while engaging into the right and left fan-shaped recess portions 11b.

Figure 8:
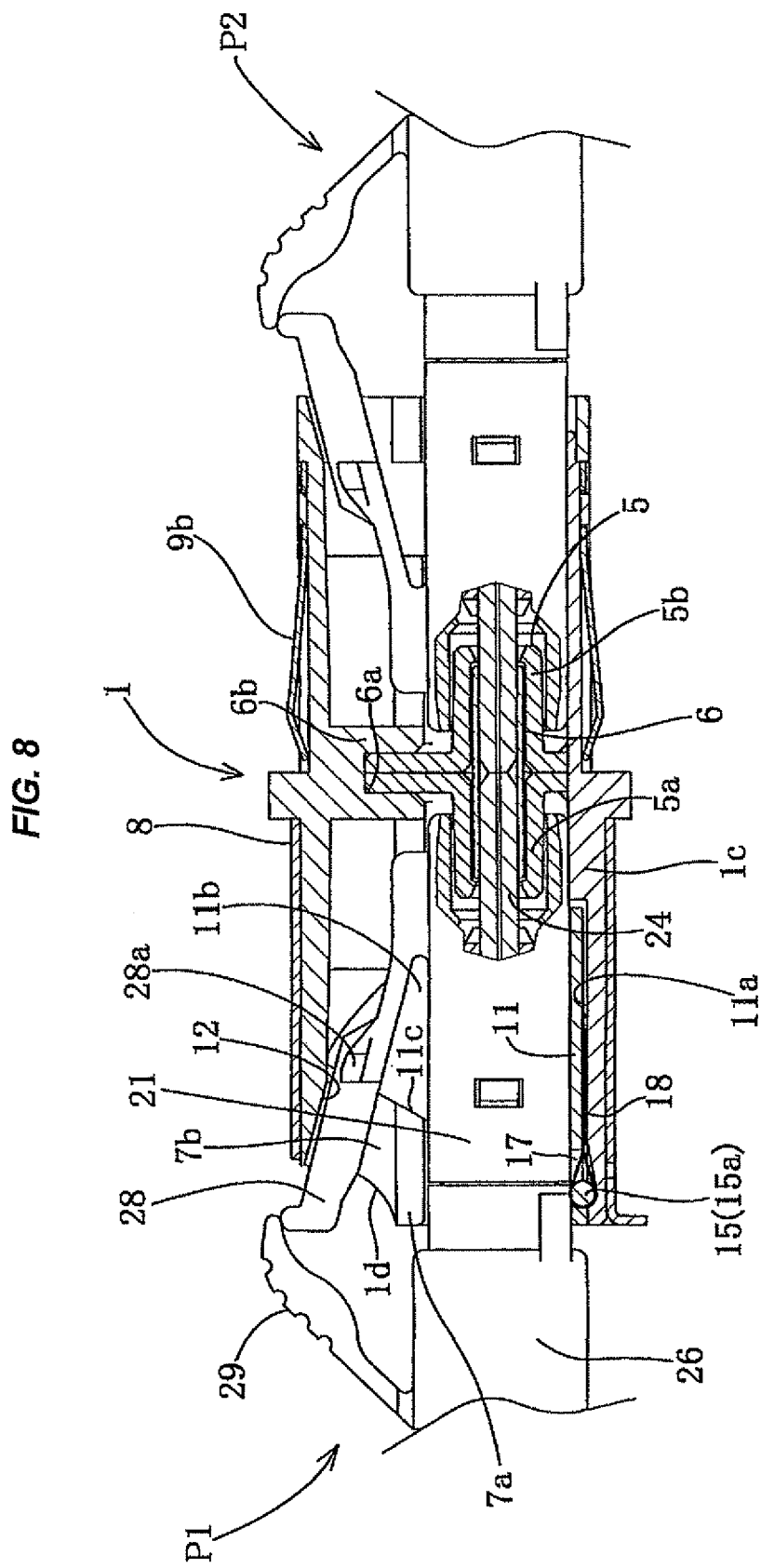
FIG. 8 describes the inserting process of the LC type optical connector plug into the interconnecting adapter for the LC type optical connectors with shutter, and is a center vertical cross sectional view of a state after the insertion.

As shown in FIG. 8, when the LC type optical connector plug P1 is further pressed into the fitting portion A of the connector housing 1, the shutter plate 11 is engaged and inserted into the concave portion 11a in the horizontal state. Further, when the LC type optical connector plug P1 is completely pressed into the fitting portion A, the LC type optical connector plug P1 is firmly pinched between the shutter plate 11 and the upper side wall 1a of the connector housing 1 on the basis of the elastic force of the leaf spring 18, and the connecting work is finished.

As mentioned above, in the present embodiment, since the shutter plate 11 closes the fitting portion A according to the diagonal arrangement, it is possible to avoid the contact of the ferrule core portion of the inserted LC type optical connector plug P1 with the surface of the shutter plate 11. As a result, it is possible to prevent the end surface of the LC type optical connector plug P1 from being soiled so as to lower the performance.

Further, since the shutter plate 11 integrally has the support shaft 15 in its lower end, and is structured such that the protruding portions 15a provided in both ends of the support shaft 15 are rotatably supported to the lower end of the fitting portion A of the connector housing 1, it is possible to optimize the position of the support shaft 15 of the shutter plate 11 which is defined by the opening width covered by the shutter plate 11 and the avoidance of the obstacle, for example, the locking piece of the split sleeve 6, existing on the opening and closing track of the shutter plate 11. Accordingly, it is possible to optimize a whole length of the adapter for the LC type optical connector. Further, it is possible to achieve space saving of the adapter for the LC type optical connector, and an assembling performance is improved.

Further, since the leaf spring 18 is structured such that one end of the leaf spring 18 is arranged so as to be extended to the optical axis, when the shutter plate 11 is brought into pressure contact with the inner side of the fitting portion A of the connector housing 1, it is possible to reflect the light to a different angle from the optical axis. Further, since the leaf spring 18 itself can be formed by using a metal as a material, the leaf spring can maintain durability even in the case that the leaf spring is heated by the light having strong energy.

What is claimed is:

1. An interconnecting adapter for LC type optical connectors, the adapter comprising:
    a connector housing having at both ends thereof fitting portions from which LC type optical connector plugs are adapted to be inserted respectively so that optical axes are aligned;
    a sleeve holder installing and retaining each of leading end portions of the LC type optical connector plugs inserted from the fitting portions in both ends, the sleeve holder being arranged in an inner portion of the connector housing;
    a shutter plate which is diagonally arranged and closing at least one fitting portion of said connector housing;
    a leaf spring which energizes the shutter plate in a closing direction;
    the shutter plate and the leaf spring being arranged in said fitting portion; and
    said shutter plate being configured to be opened against a pressing force of the leaf spring when the LC type optical connector plug is inserted from the fitting portion of said connector housing so as to fit into said sleeve holder,
    wherein said connector housing has a pair of left and right side walls, and has in its inner side of each side wall a guide groove line configured to guide the LC type optical connector plug when inserted from said fitting portion, and a recess portion configured to conform to a swing motion of said shutter plate,
    wherein said guide groove line comprises a concave groove portion and a guide protrusion provided in the concave groove portion,
    said concave groove portion and guide protrusion being formed in the inner side of each side wall of the connector housing along a longitudinal direction of the connector housing, and configured so as to conform to an outer shape of said LC type optical connector plug,
    wherein said recess portion is formed so that a side surface of the movable portion of the shutter plate engages a side surface of the recess portion between a diagonal arrangement which closes the fitting portion and a horizontal arrangement which opens the fitting portion so as to freely swing, and
    wherein a part of said guide groove line is cut so as to form an abutment surface by which the side surface of the movable portion of the shutter plate is locked in the diagonal arrangement.

2. The interconnecting adapter for the LC type optical connectors according to claim 1, wherein the recess portion is formed as a fan shape which is defined between the abutment surface in the diagonal arrangement and the horizontal arrangement.

3. The interconnecting adapter for the LC type optical connectors according to claim 1 or 2, wherein the shutter plate is structured such that the side surface of the movable portion is formed so as to be wider than the fitting portion for conforming to the side surface of the recess portion.

* * * * *